United States Patent [19]
Petersmann et al.

[11] Patent Number: 5,514,046
[45] Date of Patent: May 7, 1996

[54] METHOD FOR CONTROLLING AN INFINITELY VARIABLE MOTOR VEHICLE TRANSMISSION

[75] Inventors: Joseph Petersmann, Wimsheim; Willi Seidel, Eberdingen-Hochdorf; Heinz Stehle, Weissach; Werner Möllers, Wiernsheim; Uwe Fröschke, Wimsheim, all of Germany

[73] Assignee: Ing. h.c.F. Porsche AG, Germany

[21] Appl. No.: 167,925

[22] PCT Filed: May 22, 1992

[86] PCT No.: PCT/EP92/01156

§ 371 Date: Dec. 21, 1993

§ 102(e) Date: Dec. 21, 1993

[87] PCT Pub. No.: WO93/00532

PCT Pub. Date: Jan. 7, 1993

[30] Foreign Application Priority Data

Jun. 21, 1991 [DE] Germany .................. 41 20 546.4

[51] Int. Cl.⁶ .................. F16H 61/02; B60K 41/12; B60K 41/28
[52] U.S. Cl. .................. 477/39; 477/43; 477/46
[58] Field of Search .................. 477/43, 46, 38, 477/39

[56] References Cited

U.S. PATENT DOCUMENTS

| | | | |
|---|---|---|---|
| 4,507,986 | 4/1985 | Okamura et al. | 477/48 X |
| 4,593,581 | 6/1986 | Omitsu | 477/48 X |
| 4,622,865 | 11/1986 | Itoh et al. | |
| 4,671,138 | 6/1987 | Nobumoto et al. | 477/46 X |
| 4,793,217 | 12/1988 | Morisawa et al. | 477/48 X |
| 4,852,429 | 8/1989 | Künzer et al. | 477/43 |
| 4,867,732 | 9/1989 | Soga et al. | 477/46 X |
| 5,006,093 | 4/1991 | Itoh et al. | 477/39 X |
| 5,097,725 | 3/1992 | Sawa. | |
| 5,161,433 | 11/1992 | Sakaibara et al. | 477/43 |

FOREIGN PATENT DOCUMENTS

| | | |
|---|---|---|
| 0306216 | 3/1989 | European Pat. Off. . |
| 0406616 | 1/1991 | European Pat. Off. . |
| 0421241 | 4/1991 | European Pat. Off. . |
| 0421202 | 4/1991 | European Pat. Off. . |
| 3341652 | 6/1985 | Germany . |
| 3922051 | 1/1991 | Germany . |
| 63-269744 | 11/1988 | Japan ........ 477/43 |
| 2-150556 | 6/1990 | Japan ........ 477/43 |

OTHER PUBLICATIONS

Patent Abstract of Japan, vol. 9, No. 92 (M–373) (1815) 20 Apr. 1985 & JP, A, 59 217 050 (Toyota Jidosha K. K.) 7 Dec. 1984.

Patent Abstracts of Japan, vol. 13, No. 415 (M870) (3763) 13 Sep. 1989 & JP, A, 1 153 857 (Toyota Motor Corp.) 16 Jun. 1989.

*Primary Examiner*—Rodney H. Bonck
*Attorney, Agent, or Firm*—Evenson, McKeown, Edwards & Lenahan

[57] ABSTRACT

A method for controlling an electro-hydraulically operated infinitely variable transmission of a motor vehicle which is driven, in particular, by an internal-combustion engine, provides a control of the infinitely variable transmission according to several characteristic control curves. The characteristic control curves are selected corresponding to a driving activity which evaluates the driver's driving style or his action with respect to the control of the motor vehicle caused by a traffic situation. The characteristic control curves cover, at least in steps, the range between a characteristic control curve permitting the consumption-optimized operation of the motor vehicle and a characteristic control curve which permits the power-optimizing operation of the motor vehicle.

28 Claims, 5 Drawing Sheets

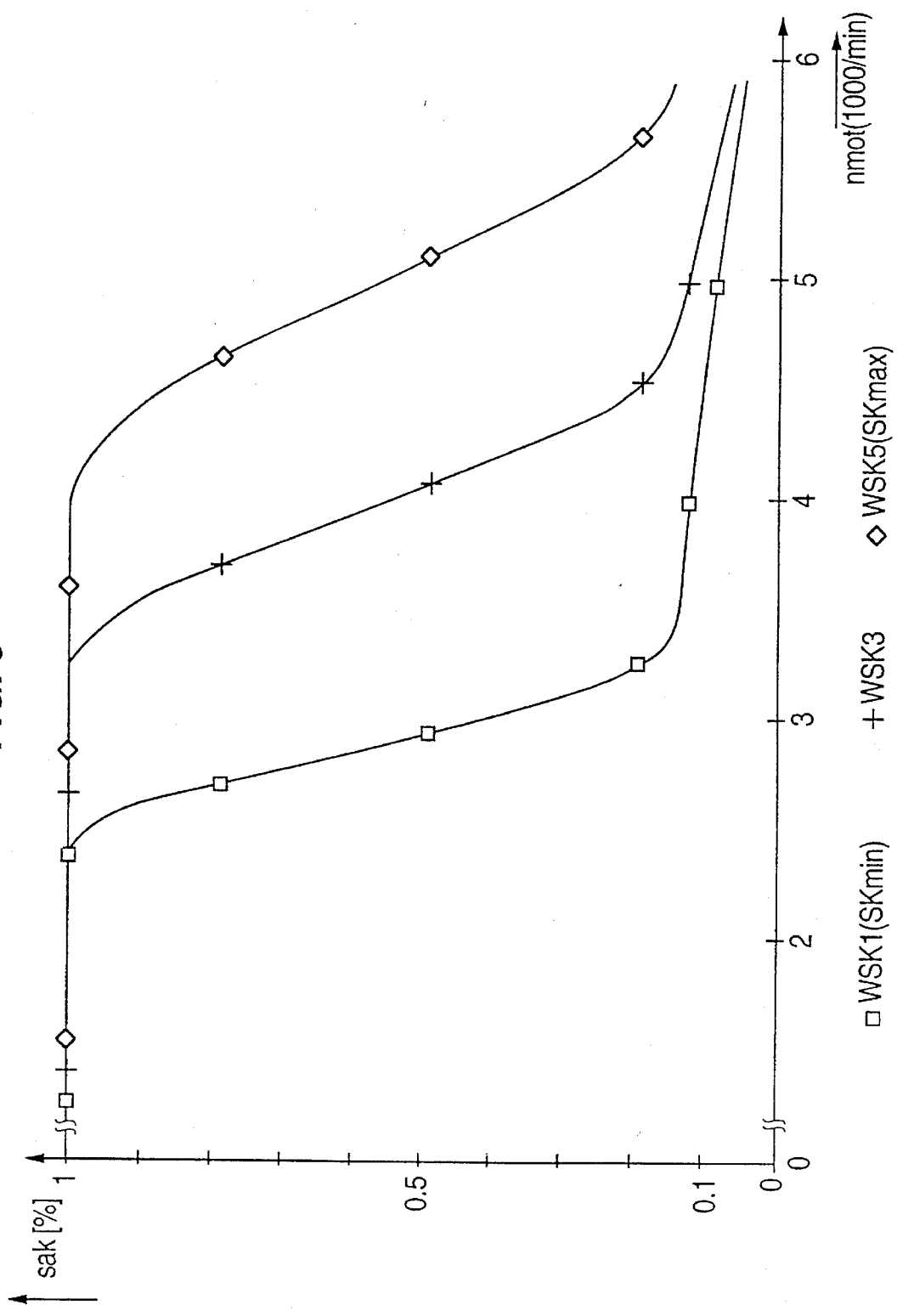

METHOD FOR CONTROLLING AN INFINITELY VARIABLE MOTOR VEHICLE TRANSMISSION

BACKGROUND AND SUMMARY OF THE INVENTION

The present invention relates to a method for controlling an electrohydraulically operated infinitely variable transmission of a driven motor vehicle.

Conventional methods for controlling infinitely variable motor vehicle transmissions adjust the ratio of the transmission via a characteristic control curve automatically at least as a function of the position of the throttle valve and the rotational speed of the engine. In this case, the characteristic control curve is designed according to the following criteria: It must permit an operation that is either as economical as possible or an operation that is as power-oriented as possible.

In this regard, it has become known from Japanese Patent Document JP-OS 59-217050 to control an infinitely variable transmission on the basis of characteristic diagrams which are selected corresponding to a driving situation. As a result, it is achieved that the driver's requirements with respect to a consumption—favorable driving and driving performances are taken into account.

However, the internal-combustion engines which, as a rule, are used for driving the motor vehicle do not permit both criteria to be met at the same time. Frequently, there can therefore only be a compromise between two extremes because a purely consumption-optimized characteristic control curve does not offer sufficient safety reserves in critical traffic situations, and the fuel consumption is too high in the case of a power-optimized characteristic control curve.

Another possibility is the manual change-over between consumption-optimized and power-optimized characteristic control curves. However, this case, the driver must first operate a change-over switch before the corresponding switching program is made available to him. Moreover, only two extreme alternatives are offered to the driver which, however, permit only either a consumption-oriented or a power-oriented vehicle handling.

From German Patent Documents DE-PS 33 41 652 and DE 39 22 051 A1, it has become known in this context to automate this manual change-over. For this purpose, at least one accelerator pedal or throttle valve signal which is proportional to the position of the accelerator pedal is scanned and stored. By means of the scanned value, signal values which were detected earlier and were stored are continuously updated and a driving activity is calculated which evaluates a driver's driving style or his actions with respect to the control of the motor vehicle which are the result of a traffic situation. This driving activity will then be used for selectively influencing limit values for shifting decisions or for the selection of characteristic shifting curves in such a manner that the transition from the consumption-optimized shifting program to the power-optimized shifting program takes place continuously or in steps.

By means of the described devices and methods, it is therefore possible to simulate the driver's driving style by detecting a quantity which is representative of this style. However, the methods which are used as the basis can be applied to infinitely variable transmissions only to a limited degree because the latter have substantially different requirements and possibilities with respect to the control. Thus, infinitely variable transmissions, for example, permit a larger spread of the transmission ratios and allow an operation of the internal-combustion engine in virtually any possible and useful operating point.

It is therefore an object of the invention to provide a method for controlling an infinitely variable motor vehicle transmission by means of which a motor vehicle equipped with this type of transmission can be operated as optimally as possible and which is automatically adjusted to a driving style of the driver or to his actions with respect to the control of the motor vehicle caused by the traffic situation.

The principal advantages of the invention are that a method is provided for controlling an infinitely variable motor vehicle transmission which, based on a control method that is as consumption-optimal as possible, is dynamically adapted to the driver's vehicle handling, without the requirement of operating additional operating elements.

This is mainly achieved by the fact that the ratio of the transmission is automatically adjusted indirectly via characteristic control curves at least as a function of the position of the power control element, such as a throttle valve or an accelerator pedal and of the rotational speed of the engine of the internal-combustion engine. In this case, the characteristic control curve is selected from a family of several characteristic control curves corresponding to a driving activity which evaluates the driver's driving style or his actions with respect to the control of the motor vehicle which are the result of a traffic situation.

The characteristic control curves cover at least in steps the range between a characteristic control curve which permits the consumption-optimized operation of the motor vehicle and a characteristic control curve which permits the power-optimized operation of the motor vehicle.

Advantageously, the transmission ratio is adjusted in such a manner that the rotational speed of the engine follows a desired rotational engine speed value which is assigned via the momentarily selected characteristic control curve to a momentary value of the throttle valve position.

In a lower value range of the throttle valve position, the characteristic control curves preferably have a progressive course which changes into a degressive course in a medium range.

On the one hand, this results in a control action of the transmission which is optimally adapted to the driver's driving style or to his actions caused by a traffic situation, and, on the other hand, the control method permits, with respect to the overall vehicle, virtually the adjustment of a desired power value by the driver and its control via the internal-combustion engine—transmission system.

Other objects, advantages and novel features of the present invention will become apparent from the following detailed description of the invention when considered in conjunction with the accompanying drawings.

BRIEF DESCRIPTION OF THE DRAWINGS

FIG. 5 is a family of impressed characteristic curves of a torque converter.

DETAILED DESCRIPTION OF THE DRAWINGS

Figure 1:
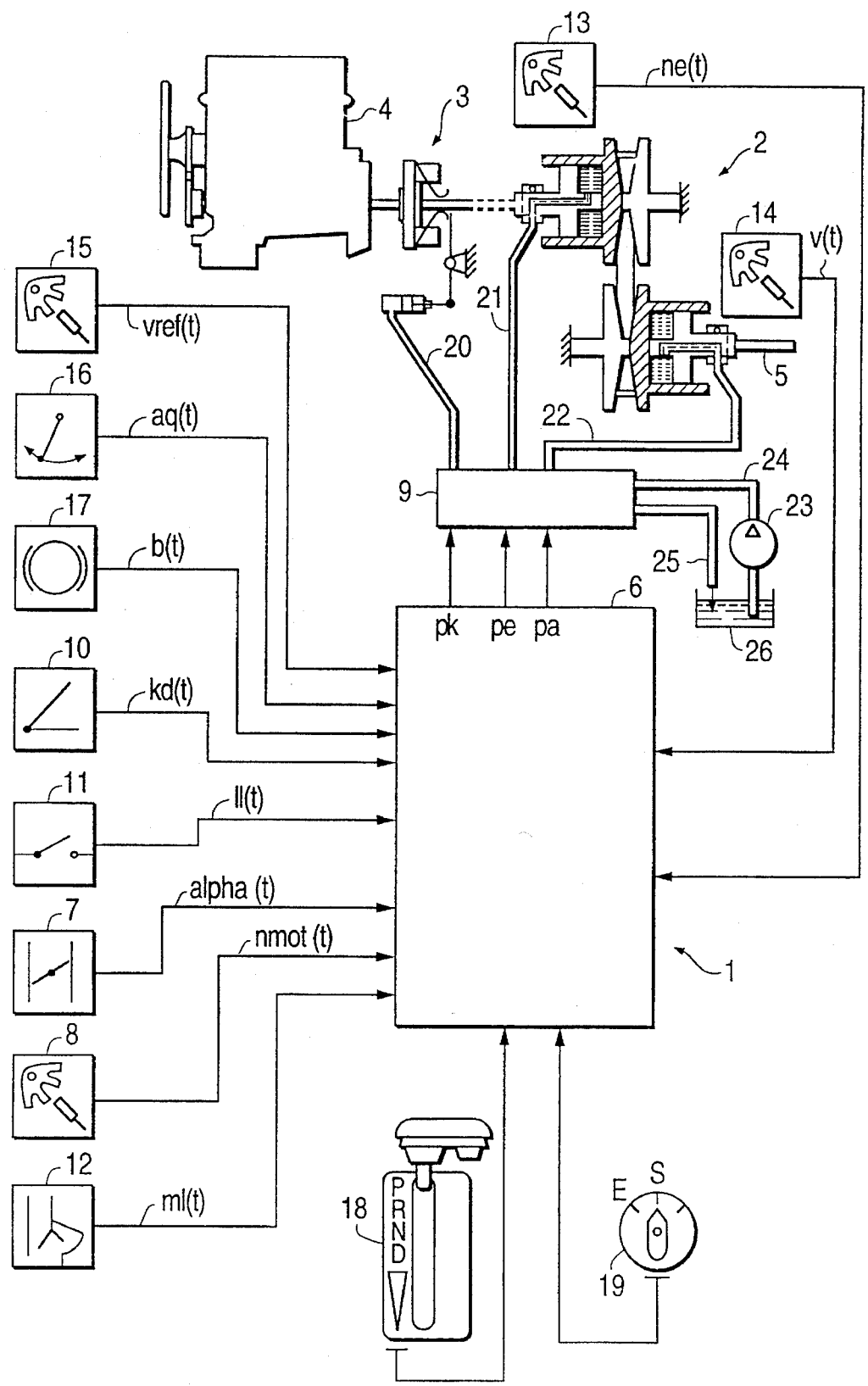
FIG. 1 is a block diagram of an electric control constructed in accordance with an embodiment of the present invention for an infinitely variable transmission of a motor vehicle.

In FIG. 1, reference number 1 indicates a control arrangement of an electrohydraulically operated infinitely variable transmission 2 on the example of a wind-around transmission.

By means of a controllable starting clutch 3, the infinitely variable transmission 2 is driven by an internal-combustion engine 4. An output shaft 5 of the infinitely variable transmission 2 is connected with a wheel drive of a motor vehicle which is not shown.

In the following, functions or variables which change with time t are called functions f(t) of time t.

A control unit 6 of the control arrangement 1 controls a hydraulic valve block 9 at least as a function of the throttle valve position alpha(t) of a throttle valve angle generator 7, which represents the position of a power control element of the internal-combustion engine, and a rotational engine speed nmot(1) of a rotational engine speed generator 8 of the internal-combustion engine 4. For controlling the infinitely variable transmission 2 and the starting clutch 3, the control unit 6 receives, as further input values or measuring signals, a kick-down signal kd(t) of a kick-down switch 10, an idle signal 11(t) of an idle switch 11, an air quantity or air mass ml (t) of an air quantity generator or air mass generator 12 supplied to the internal-combustion engine 4, as well as the rotational transmission input speed ne(t) of a rotational transmission input speed generator 13, and a driving speed v(t) of a driving speed generator 14 of the motor vehicle (rotational transmission output speed). In addition, the control unit 6 detects and processes a speed vref(t) of a reference speed generator 15 on a non-drivable vehicle axle, of a lateral acceleration aq(t) of a lateral acceleration generator 16 and a braking signal b(t) of a braking signal generator 17.

Finally, the control can normally be influenced by the vehicle driver via a selector lever 18 for the preselection of driving positions P (parking position), R (reverse gear position), N (neutral position), D (automatic adjustment of the transmission ratio ue of the infinitely variable transmission). In addition, an adjusting range of the selector lever 18 is provided for the direct presetting of the transmission ratio ue.

Figure 2:
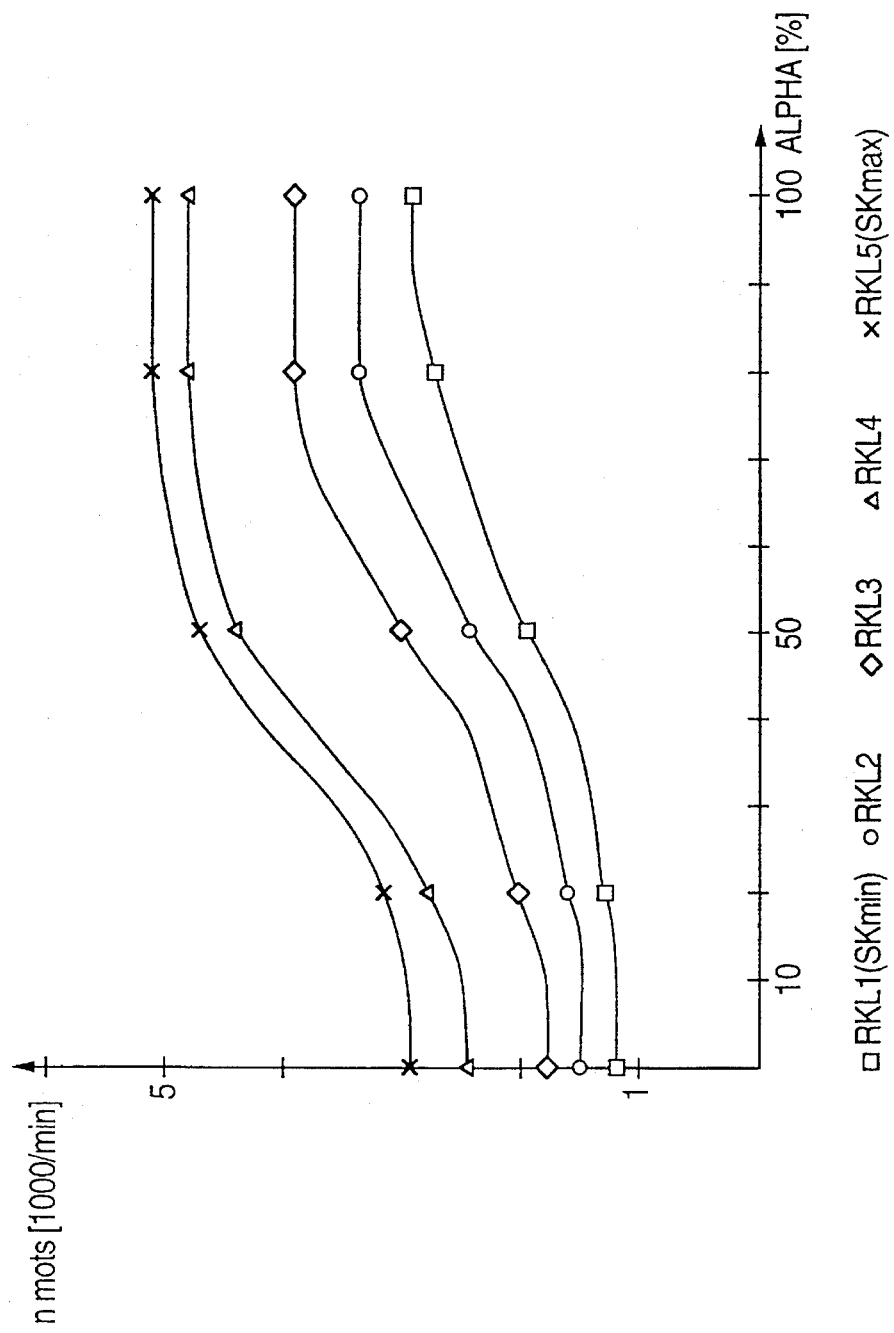
FIG. 2 is a family of several characteristic control curves which assign to values of the throttle valve angle certain desired rotational engine speed values.

In conventional transmission controls, the characteristic control curve, according to which the control unit 1 controls the infinitely variable transmission in driving position D, is finally selected via a program selecting switch 19. In this case, two characteristic control curves RKLj can be selected as a rule in which case, in position E, a consumption optimized characteristic control curve RKL1 and in position S, a power-optimized characteristic control curve RKL5 can be adjusted manually, as seen in FIG. 2.

As an alternative to the program selecting switch 19, a control method may also be implemented in the control unit 6 which, for example, according to German Patent Document 33 48 652 C2 or German Patent Document DE 39 22 051 A1, evaluates the driving style of a driver or his action with respect to the control of the motor vehicle caused by the traffic situation and derives a driving activity SK(t) (accelerator pedal activity) from one or several operating or driving parameters. On the basis of this driving activity SK(t), corresponding to a switching position of the program selecting switch 19, according to the present invention, one of several characteristic control curves RKLj (j=1, 2, ..., 5) can then be used for the control of the infinitely variable transmission or of the starting clutch 3. See, for example, FIG. 2.

Without any limitation of the generality, the infinitely variable transmission 2 may be controlled, instead of via characteristic control curves, also via characteristic control diagrams as a function of several arbitrary operating or driving parameters of the motor vehicle.

As a function of the mentioned quantities, the control unit 6 of the present invention controls, via a signal output pk and the valve block 9, the hydraulic pressure in the starting clutch 3 via the signal outputs pe and pa and the hydraulic valve block 9, the transmission ratio ue(t) between the rotational transmission input speed ne(t) and the rotational transmission output speed (driving speed) v(t) is controlled.

In this case, the transmission ratio ue(t) is proportional to the quotient of the rotational transmission input speed ne(t) and the driving speed v(t): ue(t)=prop*(ne(t)/v(t)); prop corresponds to a proportionality constant. In this case, a numerical increase/decrease of the transmission ratio ue(t) means a short/long transmission ratio.

For this purpose, the hydraulic valve block 9 connects the corresponding control connections 20, 21 and 22 of the starting clutch 3 and of the infinitely variable transmission 2 with a pressure line 24 connected to a pump 23 or a return flow line 25 to a storage tank 26 for hydraulic fluid.

Corresponding to the method for controlling the infinitely variable transmission 2, according to the present invention, the ratio ue of the transmission is indirectly adjusted automatically by the control unit 6 and the valve block 9 via characteristic control curves RKLj at least as a function of the throttle valve position alpha(t) and of the rotational engine speed nmot(t). The characteristic control curve RKLj is selected from a family of several characteristic control curves RKLj (j=1, 2, ..., 5) shown in FIG. 2 corresponding to the driving activity SK(t) which evaluates the driver's driving style or his action with respect to the control of the motor vehicle caused by a traffic situation.

In this case, the characteristic control curves illustrated in FIG. 2 cover at least in steps the range between a characteristic control curve RKL1, which permits a consumption-optimized operation of the vehicle, and a characteristic control curve RKL5 by means of which the motor vehicle can be operated in a power-optimized manner.

The control of the infinitely variable transmission 2 is therefore automatically adapted to the driver's vehicle handling so that a manual intervention or a change of the characteristic control curves does not have to be carried out. The program selecting switch 19 according to FIG. 1 is therefore not necessary.

The ratio ue of the infinitely variable transmission 2 is adjusted by the control unit 6 preferably in such a manner that the rotational engine speed nmot(t) follows as optimally as possible a desired rotational engine speed value nmots. For this purpose, a cascade rotational speed governor may be implemented in the control unit 6. The ratio ue is therefore a function of the desired rotational engine speed value nmots, of the rotational engine speed nmot and of the time t: ue=f(nmots, nmot, t). A deviation Dnmot(t)=nmots(t)−nmot(t) of the rotational engine speed nmot(t) from the desired rotational engine speed value nmots(t) is guided toward 0.

In this case, the instantaneous value of the desired rotational engine speed value nmots is determined via the instantaneously selected characteristic control curve RKLj according to FIG. 2 from the instantaneous value of the throttle valve position alpha(t) and the driving activity SK(t): nmots=RKLj(alpha, SK). Also in this case, the characteristic control curves RKLj may again be expanded to characteristic control diagrams in order to make the control of the transmission 2 dependent on further parameters.

As illustrated in FIG. 2., the characteristic control curves RKLj extend essentially as follows: In a lower value range of the throttle valve position alpha, the characteristic control curves RKLj have a progressive course which, in a medium range of the throttle valve position alpha, changes to a degressive course. The throttle valve position alpha is entered in percent on the horizontal axis, the value 0% corresponding to the closed throttle valve and the value 100% corresponding to the fully opened throttle valve.

Five characteristic control curves RKL1, RKL2, RKL3, RKL4 and RKL5 are entered, in which case the characteristic control curve RKL1 permits the consumption optimized operation of the motor vehicle and is selected in the case of a minimal driving activity SK(t)=SKmin. The characteristic control curve RKL5 is selected in the case of a maximal driving activity SK(t)=SKmax, at which the power-optimized operation of the motor vehicle is possible. The characteristic control curves RKL2 to RKL4 which are situated in-between are used for the control in a graduated manner as the driving activity SK(t) increases.

Corresponding to German Patent Document DE 33 41 652 C2 or German Patent Document DE 39 22 051 A1, herein incorporated by reference, the driving activity SK(t) is determined by means of a functional relationship of cyclically or anticyclically detected actual or past values of a single operating parameter or a single parameter which is composed of several operating parameters of a motor vehicle, which functional relationship evaluates for an extended period of time the driver's driving style or his action caused by a traffic situation.

In this case, the values of the throttle valve position alpha (t), of the driving speed v(t) and of the lateral acceleration aq(t), for example, are detected in the second range or millisecond range, and from them, further values are calculated, such as the throttle valve changing speed dalpha(t)/dt and the acceleration of the vehicle dv(t)/dt. Via characteristic diagrams, the determined and calculated values are linked with further parameters and are combined to form an intermediate parameter via a functional relationship, from which intermediate parameter, by means of a sliding average value formation, which takes into account for an extended period of time the newly calculated values as well as the past values, a driving activity SK(t) is determined.

Via a further functional relationship, this driving activity SK(t) is finally assigned to a characteristic control curve RKLj, for example, corresponding to the manner indicated in German Patent Document DE 39 22 051 A1.

Particularly in connection with infinitely variable transmissions, it was found that it may be useful to interrupt, during defined operating conditions of the motor vehicle, the evaluation of the driver's driving style or his action caused by the traffic situation.

In this case, a first operating condition will occur when the motor vehicle stops while the internal-combustion engine is running. This first operating condition may be defined, for example, by driving speed v(t)≈0 and rotational engine speed nmot(t)>0 (rotational engine speed nmot(t) corresponds to a rotational idling speed: nmot(t)=nll). In this case, the momentary value of the driving activity SK(t) is stored at least for the time period for which the respective operating condition occurs, and the evaluation is continued following this time period by means of the stored value of the driving activity. This achieves that the driving activity SK(t) does not fall to the minimal value SKmin during extended stopping periods of the motor vehicle while the engine is running, for example, in the case of a stop light.

A second operating condition will occur as soon as the motor vehicle is parked. This operating condition is characterized by driving speed v(t)≈0 and rotational engine speed nmot(t)≈0 or a switched-off ignition of the motor vehicle or of the driving internal (combustion) engine. In this case also, the momentary value of the driving activity (SK(t)) can be stored again at least for the time period for which the respective operating condition occurs, and the evaluation can be continued following this time period by means of the stored value of the driving activity.

In a supplementary manner, a push button may advantageously be provided (for example, in the area of the dashboard of the motor vehicle) which is to be operated manually by the driver and by means of which the driving activity SK(t) can be set back to a basic value, for example, the value SKmin.

As an alternative to the second operating condition, under the conditions existing there, the driving activity may also be set back automatically to the basic value SKmin (third operating condition).

Without an interruption of the evaluation of the driver's driving style or his action caused by the traffic situation, the driving activity SK(t) is temporarily set to a value SKmax (characteristic control curve RKL5) which permits the power-optimized operation of the motor vehicle, when the time variation of the throttle valve position dalpha/dt exceeds a first (positive) limit value Alphagl and as long as the throttle valve position alpha(t) has not yet fallen below a determined value afg: alpha(t)>afg. As a result, it is achieved that the driver, in the case of a sudden increased power demand, receives a power-optimized control function even when he does not operate the kick-down switch 10 (fast stepping on the accelerator pedal without reaching the stop and thus actuating the kick-down switch 10).

In a further development of the invention, the ratio ue of the transmission is held when a condition of a holding of the ratio usf is active (usf=1), in which case the condition of holding the ratio changes into the active condition usf=1, when the time variation dalpha(t)/dt of the throttle valve position alpha(t) falls below a second (negative) limit value--alphag2, and the coasting operation is recognized. After a first time period T1(SK(t)) has expired, the condition of the holding of the ratio usf changes into the inactive condition, usf=0, when the drive operation is recognized.

As an alternative in this respect, as long as the condition of the holding of the ratio usf is active, usf=1, the ratio ue may then, at least for that time period, be adjusted (lowered) by means of a first determined finite and relatively slow speed (first time variation of the ratio ckl=due/dt=f(SK(t)) to that value of the ratio ue which is provided in the instantaneous operating point of the motor vehicle (alpha(t), v(t), nmot(t), t) in the instantaneously adjusted characteristic control curve RKLj. In this case, the condition of the holding of the ratio will change into the active condition, usf=1, when the time variation dalpha/dt of the throttle valve position alpha(t) falls below the second (negative) limit value–alphag2 and the coasting operation is recognized. After the expiration of a second time period T2(SK(t)), the condition of the holding of the ratio usf changes into the inactive condition, usf=0, when the drive operation is recognized.

These two cases take into account the approach to a cornering during which it was found that a driver of a motor vehicle, as a rule, moves off the accelerator pedal faster than when he wants to stop the vehicle or lets it coast. The ratio ue, which is adjusted before the occurrence of the two cases, in contrast to otherwise customary transmission controls, is in each case held for the defined time period T1 or T2 and is lowered at a reduced speed.

In this case, the terms drive operation and coasting operation are defined as follows:

The coasting operation is recognized when the throttle valve position alpha(t) falls below a rotational-engine-speed-dependent characteristic limit curve azsg(nmot) according to FIG. 3:

alpha(t)<azsg(nmot).

Figure 3:
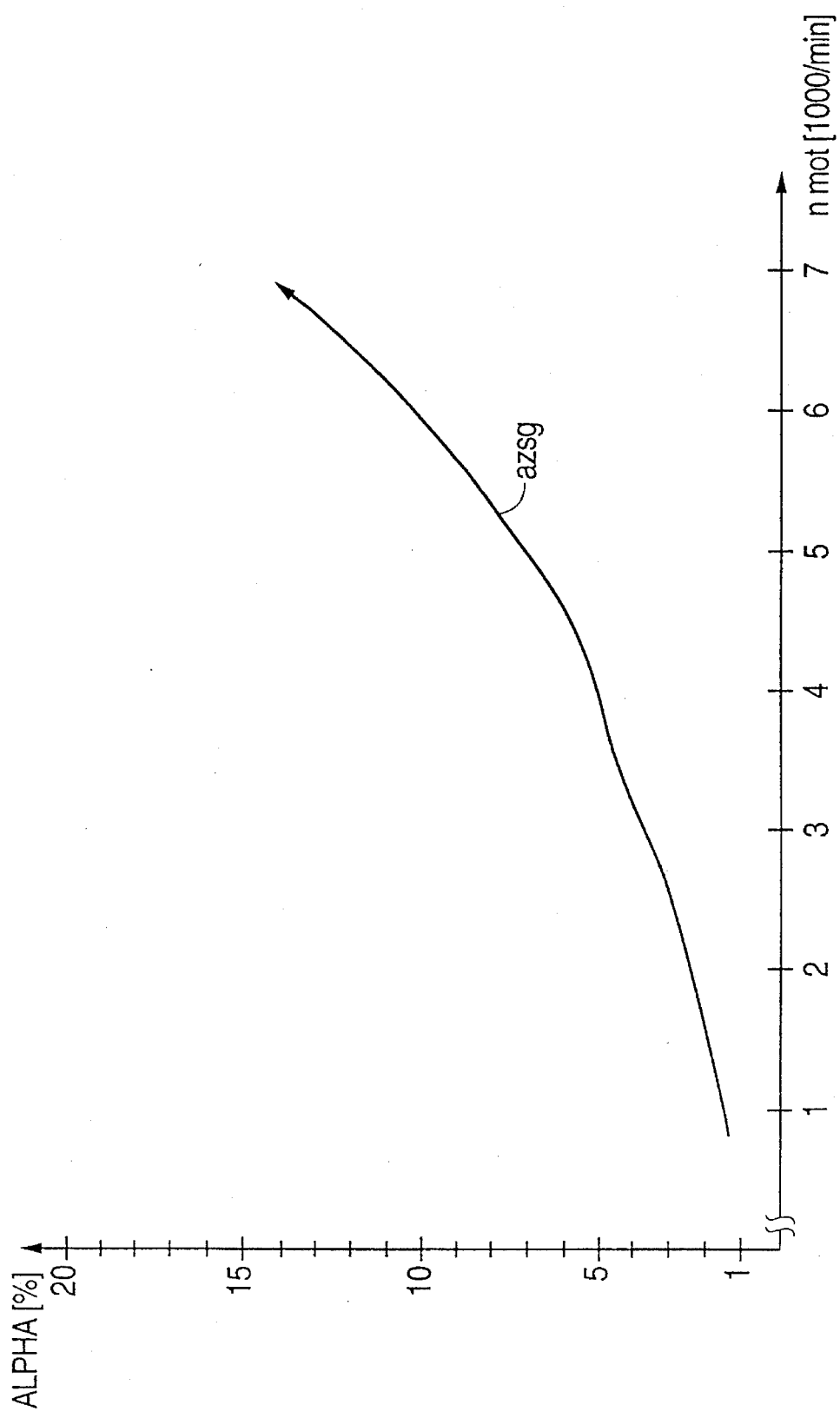
FIG. 3 is a characteristic limit curve which is a function of the rotational speed of the engine and according to which the differentiation is made between the drive operation and the coasting operation.

The drive operation is recognized when the throttle valve position alpha(t) exceeds the rotational-engine-speed-dependent characteristic limit curve azsg(nmot) according to FIG. 3 (alpha(t)>azsg(nmot) and the time variation of the driving speed dv(t)/dr takes on positive values:

alpha(t)>azsg(nmot)∩dv(t)/dt>0.

After the deactivating of the holding of the ratio (usf=1→usf=0) in the coasting operation, the ratio ue(t) is adjusted by means of a certain adjusting speed due/dt=FDUE(nmot, SK), starting out from the value during the transition into the coasting operation, to the value that is closest or is necessary for reaching the given desired rotational engine speed value nmots(t). In this case, this desired rotational engine speed value nmots(t) is preset by means of the momentarily selected characteristic control curve RKLj according to FIG. 2 (when the throttle valve is closed alpha(t)≈0: nmots=RKLj(alpha≈0, SK(t)).

In this case, the adjusting speed of the ratio due/dt is preferably determined via a characteristic diagram FDUE (nmot, SK), which is to be defined by experiments, from the momentary values of the rotational engine speed nmot(t) and driving activity SK(t) or those determined during the transition to the coasting operation.

As an alternative, after the deactivation of the holding of the ratio (usf=1→usf=0) in the coasting operation, the ratio ue(t) may be adjusted such that the rotational engine speed nmot(t) by means of a defined adjusting speed dnmot(t)/dt=FDNMOT(nmot, SK), starting out from the value during the transition into the coasting operation, is lowered to the desired rotational engine speed value nmots(t)RKLj–(alpha≈0, SK(t)). Also in this case, the adjusting speed of the rotational engine speed dnmot/dt is again determined via a characteristic diagram FDNMOT(nmot, SK) to be determined by experiments, from the momentary values of the rotational engine speed nmot(t) and the driving activity SK(t) or those determined during the transition into the drive operation.

In this case, the adjusting speed of the rotational engine speed dnmot(t)/dt may be kept constant if the rotational engine speed nmot(t) reaches the value of the desired rotational engine speed value nmots indicated by the momentary characteristic control curve or by the characteristic control curve determined during the transition into the coasting operation, and the rotational engine speed has not yet fallen below a limit value nmotg(SK(t)): nmot(t)>nmotg(SK(t)).

In this case, the limit value nmotg(SK(t)) may again depend on the driving activity and become larger as the driving activity increases. After there is a falling below the limit value nmot(t), the momentarily adjusted ratio ue(t) is held until the rotational engine speed nmot(t) has reached the rotational idling speed nmotll of the internal-combustion engine. Finally, when the rotational idling speed nmotll is reached, the starting clutch 3 is opened up.

By means of the control of the transmission ratio or of the rotational engine speed described here, it is achieved that the braking effect of the internal-combustion engine in the coasting operation and when the holding of the ratio usf=0 is not active, has an increased effect on the deceleration of the motor vehicle.

Figure 4:
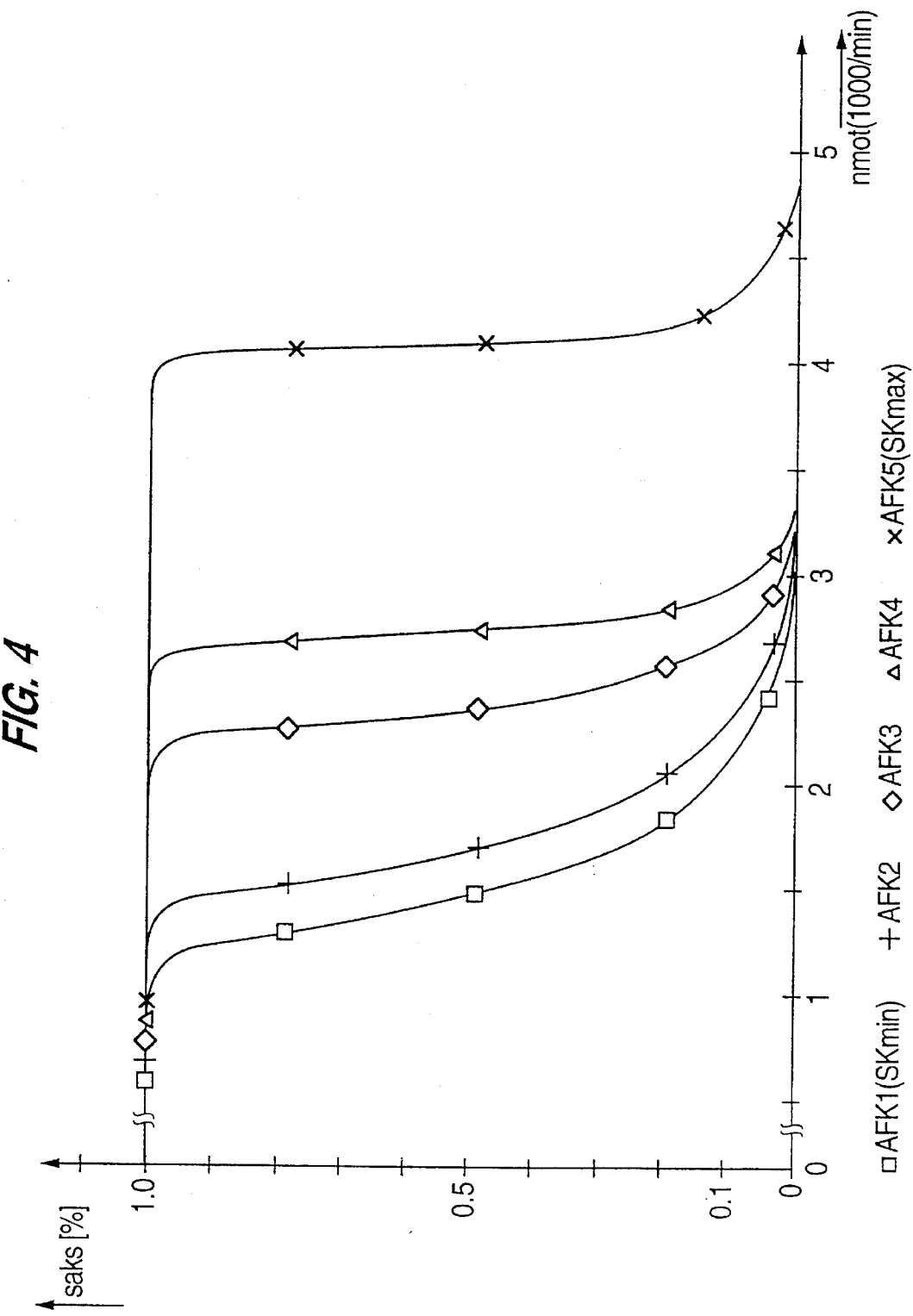
FIG. 4 is a family of characteristic starting curves which assign to values of the rotational engine speed in each case defined values of a desired clutch slip.

Also, according to the invention, a characteristic starting curve AFK(SK(t)) is selected from a family of several characteristic starting curves AFKi (i=1, 2, . . . , 5), corresponding to the value of the driving activity SK(t) determined before the starting operation or before the stopping of the motor vehicle, according to which characteristic starting curve AFK(SK(t)) a driving clutch 3, which is connected in front of the infinitely variable transmission 2, is controlled as a function of at least the rotational engine speed nmot(t) during a starting operation; see FIG. 4: AFK1 for SKmin, AFK2 to AFK4 graduated according to increasing values of the driving activity SK(t), AFK5 for SKmax.

As a result, it is possible to adjust a gripping point corresponding to the driving activity SK(t) at which the differential rotational speed Dk(t)=nmot(t)–ne(t) between the rotational engine speed nmot(t) and the rotational transmission input speed ne(t) becomes zero. At higher values of the driving activity, the gripping point is shifted toward higher rotational engine speeds and thus, in the case of internal-combustion engines, toward higher values of the engine torque or the engine power.

In this case, the pressure on the friction members of the starting clutch 3 is adjusted such that the rotational speed difference (clutch slip) related to the rotational engine speed nmot(t)—sak(t)–Dk(t)/nmot(t)=(nmot(t)–ne(t))/nmot(t)— between the rotational engine speed nmot(t) and the rotational transmission input speed ne(t) via the characteristic starting curve AFK(SK(t)) according to FIG. 4, is caused to follow a desired clutch slip saks(t) which is assigned to a momentary value of the rotational engine speed nmot. This may take place, for example, by means of a cascaded control circuit.

The characteristic starting curves AFK(SK(t)) assign falling values of the desired clutch slip to increasing values of the rotational engine speed nmot. As the values of the driving activity SK(t) increase, the characteristic starting curves AFK(SK(t)) are shifted toward higher values of the rotational engine speed nmot.

Advantageously, the starting clutch is opened up or the momentarily adjusted ratio ue is reduced when in the coasting operation an amount of a differential speed |Dv(t)|=|vref(t)–v(t)| between a speed vref(t) of a non-drivable axle and the driving speed v(t) detected on a drivable axis exceeds a permissible differential speed value Dvzul(SK(t)): |Dv(t)|<| Dvzul(SK(t))|. This measure can therefore reduce an excessive brake slip.

If the motor vehicle is equipped, instead of with a starting clutch 3, with a controllable torque converter as a torque-converting starting device which is connected in front of the transmission 2, its impressed characteristic curve WSK(SK(t)) (clutch slip or converter slip sak above the rotational engine speed nmot) is selected corresponding to the value of the driving activity SK(t) determined before the starting operation and before the stopping of the motor vehicle and is adjusted to be softer with an increasing driving activity SK(t) at least during the starting operation.

In this case, the softer adjustment of the characteristic curve WSK(SK(t)) permits higher rotational speeds of the driving internal-combustion engine and thus higher values of the torque used for the starting or of the adjusted power. Corresponding characteristic converter curves WSK1(SK=SKmin), WSK3(SK) and WSK5(SK=SKmax) are illustrated in FIG. 5.

Furthermore, advantageously, a value of the ratio ue(t) during a starting operation can be adjusted corresponding to the value of the driving activity SK(t) determined before the starting operation or before the stopping of the motor vehicle. As the driving activity SK(t) increases, the value of the ratio during the starting operation is increased.

If the torque converter is equipped with a shiftable converter bridging clutch for the bridging of the torque converter, shifting limits, at which the converter bridging clutch is opened up (nmot<wuko(SK(t))) or closed (nmot>wuks(SK(t))), may depend at least on the driving activity SK(t). As the driving activity increases and is more power-oriented, the shifting limits are displaced in the direction of lower values.

Finally, an occurring driving or braking slip can advantageously be prevented in that the momentarily adjusted ratio ue of the transmission is reduced if the amount of the differential speed between the speed vref of a non-drivable axle and the driving speed v(t) detected on a drivable axle exceeds the permissible differential speed value Dvzul(SK(t)). When the permissible differential speed value Dvzul(SK(t)) is exceeded, a converter bridging clutch of a transmission equipped with a torque converter may be opened up;

a holding time Th(SK(t)) may be set during which a reduction of the ratio cannot be prevented; and an increase of the ratio can be prevented, in which case these functions are set back again when a coasting operation is recognized and positive values of the change of the driving speed v(t) exist, and the amount of the differential speed Dv(t) is smaller than the permissible differential speed value Dvzul(SK(t)).

The time periods T1(SK(t)), T2(SK(t)), the holding time Th(SK(t)) and the permissible differential speed value Dvzul(SK(t)) may depend on the driving activity SK(t). As the driving activity SK(t) increases, the time periods T1(SK(t)) and T2(SK(t)) become longer, while the holding time Th(SK(t)) and the permissible differential speed value Dvzul(SK(t)) decrease as the driving activity SK(t) increases. The time periods and the holding time vary preferably in a range of from 1 to 3 seconds.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A method for controlling an electro-hydraulically infinitely variable transmission of a driven motor vehicle that has an internal-combustion engine influenced by a power control element, comprising:

automatically indirectly adjusting the transmission ratio according to at least one characteristic control curve at least as a function of a position of the power control element and of rotational engine speed, wherein the step of adjusting includes the step of selecting a characteristic control curve from a family of characteristic control curves corresponding to a driving activity which evaluates at least one of the driver's driving style and action with respect to control of the vehicle caused by a traffic situation, wherein the characteristic control curves cover at least in steps a range between a characteristic control curve which permits consumption-optimized operation of the motor vehicle and a characteristic control curve which permits power-optimized operation of the motor vehicle.

2. A method according to claim 1, further comprising determining a desired rotational engine speed value according to the characteristics control curve based on a momentary value of the position of the power control element, wherein the ratio is adjusted such that the rotational engine speed follows the desired rotational engine speed value.

3. A method according to claim 2, wherein the characteristic control curves which assign to a defined position of the power control element a defined desired rotational engine speed value have, in a lower value range of the position of the power control element, a progressive course which changes into a degressive course in a medium range of the position of the power control element.

4. A method according to claim 1, further comprising determining the driving activity by a functional relationship, which evaluates for an extended period of time at least one of the driver's driving style, and action caused by a traffic situation, from cyclically or anticyclically detected actual and past values of at least one of a single operating parameter and a single parameter combined from several operating parameters of a motor vehicle.

5. A method according to claim 4, further comprising interrupting the evaluation of the driver's driving style or his action caused by a traffic situation under defined operating conditions of the motor vehicle.

6. A method according to claim 5, wherein a first defined operating condition occurs when the vehicle stops, the method further comprising, when the first operating condition occurs, storing the instantaneous value of the driving activity at least for the time period for which the first operating condition occurs, and continuing the evaluation following said time period, starting with the stored value of the driving activity.

7. A method according to claim 6, wherein a second defined operating condition occurs when the motor vehicle is parked, the method further comprising, when the second operating condition occurs, storing the instantaneous value of the driving activity at least for the time period for which the second operating condition occurs, and continuing the evaluation following this time period, starting with the stored value of the driving activity.

8. A method according to claim 6, wherein a third defined operating condition occurs when the motor vehicle is parked, the method further comprising, when the third operating condition occurs, setting the instantaneous value of the driving activity back automatically to a basic value.

9. A method according to claim 1, further comprising setting the driving activity back to a basic value by a manually operable push button.

10. A method according to claim 1, further comprising temporarily setting the driving activity, without any interruption of the evaluation of the driver's driving style or action caused by a traffic situation, to a value which permits power-optimized operation of the motor vehicle, as soon as time variation of a position of the power control element exceeds a first limit value and as long as the position of the power control element has not yet fallen below a fixed value.

11. A method according to claim 1, further comprising holding the transmission ratio when a ratio holding condition is active, the ratio holding condition changing to an active status when a time variation of a position of the power control element falls below a second limit value and a coasting operation is recognized, the ratio holding condition changing to an inactive status when a drive operation is recognized after the expiration of a first time period.

12. A method according to claim 1, further comprising adjusting the transmission ratio by a first defined finite and relatively slow speed to that value of the transmission ratio which is provided at a current instantaneous operating point of the motor vehicle, according to an instantaneously adjusted characteristic control curve, for at least as long a ratio holding condition is active, the ratio holding condition changing to an active status when a time variation of position of the power control element falls below the second limit value and a coasting operation is recognized, and changing into an inactive status when a coasting operation is recognized after the expiration of a second time period.

13. A method according to claim 12, wherein the coasting operation is recognized when position of the power control element falls below a rotational-engine-speed-dependent characteristic limit curve.

14. A method according to claim 13, wherein a drive operation is recognized when position of the power control element exceeds a rotational-engine-speed-dependent characteristic limit curve, and a time variation of driving speed assumes positive values.

15. A method according to claim 14, further comprising, after the deactivation of the ratio holding condition in drive operation, adjusting the transmission ratio by a defined adjusting speed such that rotational engine speed, starting from a value during transition into drive operation, is lowered to a desired rotational engine speed value while the power control element is closed.

16. A method according to claim 15, further comprising determining the adjusting speed of the rotational engine speed according to a characteristic diagram based on instantaneous values of the rotational engine speed and driving activity or those determined during transition into the drive operation.

17. A method according to claim 15, further comprising maintaining the adjusting speed of the rotational engine speed constant if the rotational engine speed reaches a value of the desired rotational engine speed value preset according to a momentary characteristic control curve or the characteristic control curve determined during transition into drive operation, and rotational engine speed has not yet fallen below a limit value.

18. A method according to claim 17, further comprising holding the instantaneously adjusted transmission ratio when rotational engine speed falls below the limit value, but has not yet reached a rotational idling speed.

19. A method according to claim 12, further comprising, after the deactivation of the ratio holding condition in drive operation, adjusting the transmission ratio by a certain adjusting speed, starting out from the value during a transition into the drive operation, to the value that is closest or necessary for reaching a desired rotational engine speed value preset by an instantaneously selected characteristic control curve while the power control element is closed.

20. A method according to claim 19, further comprising determining the adjusting speed of the transmission ratio according to a characteristic diagram based on instantaneous values of the rotational engine speed and driving activity or those determined during transition into the drive operation.

21. A method according to claim 1, further comprising selecting a characteristic starting curve from a family of several characteristic starting curves, corresponding to a value of the driving activity determined before a starting operation or before a stopping of the motor vehicle, according to which characteristic starting curve a driving clutch, which is connected in front of the infinitely variable transmission, is controlled as a function of at least rotational engine speed during a starting operation.

22. A method according to claim 21, further comprising adjusting pressure on friction members of the starting clutch 3 such that a rotational speed difference related to the rotational engine speed between the rotational engine speed and the transmission input rotational speed via the characteristic starting curve is caused to follow a desired clutch slip which is assigned to a momentary value of the rotational engine speed.

23. A method according to claim 22, wherein the characteristic starting curves assign decreasing values of the desired clutch slip to increase values of the rotational engine speed.

24. A method according to claim 23, wherein with increasing values of the driving activity, the characteristic starting curves are displaced toward higher values of the rotational engine speed.

25. A method according to claim 24, further comprising opening up the starting clutch when in the drive operation a differential speed between a speed of a non-drivable axle and driving speed detected on a drivable axle exceeds a permissible differential speed value.

26. A method according to claim 1, further comprising adjusting a value of the transmission ratio during a starting operation to correspond to a value of driving activity determined before a starting operation or before a stopping of the motor vehicle and, as the driving activity increases, displacing the value of the ratio toward higher values.

27. A method according to claim 1, further comprising reducing the momentarily adjusted transmission ratio when a differential speed between a speed of a non-drivable axle and a driving speed detected on a drivable axle exceeds a permissible differential speed value.

28. A method according to claim 1, wherein the time periods, the holding time and the permissible differential speed value depend on the driving activity, such that as the driving activity increases, the time periods and become longer, while the holding time and the permissible differential speed value decrease as the driving activity increases.

* * * * *